United States Patent [19]
Allen et al.

[11] 3,726,303
[45] Apr. 10, 1973

[54] FLUID FLOW CONTROL VALVES

[75] Inventors: Ronald Noel Allen; Harold Lloyd Dagwell, both of London, England

[73] Assignee: Henry Sykes Limited, London, England

[22] Filed: Apr. 19, 1971

[21] Appl. No.: 135,087

[30] Foreign Application Priority Data

Apr. 27, 1970 Great Britain.....................20,178/70

[52] U.S. Cl. ..............137/205, 137/202, 137/630.15
[51] Int. Cl............................F04b 21/00, F04f 3/00
[58] Field of Search.....................137/205, 202, 400, 137/423, 630.15

[56] References Cited

UNITED STATES PATENTS

| | | | |
|---|---|---|---|
| 2,322,910 | 6/1943 | Adney | 137/205 X |
| 3,018,787 | 1/1962 | Kirk | 137/202 |
| 2,710,019 | 6/1955 | Reasoner | 137/630.15 X |
| 3,612,089 | 10/1971 | Beguristain | 137/205 |

*Primary Examiner*—Alan Cohan
*Attorney*—Hall, Pollack & Vande Sande

[57] ABSTRACT

A fluid flow control valve intended to be connected between a chamber containing liquid and gas and a suction pump comprises a valve member coupled to float means located in said chamber and a branched passageway communicating on the one hand with atmosphere and on the other with said chamber, the float means serving to move the valve member in the branched passageway whereby in accordance with the liquid level in said chamber the suction pump is connected either with the chamber or with atmosphere.

3 Claims, 1 Drawing Figure

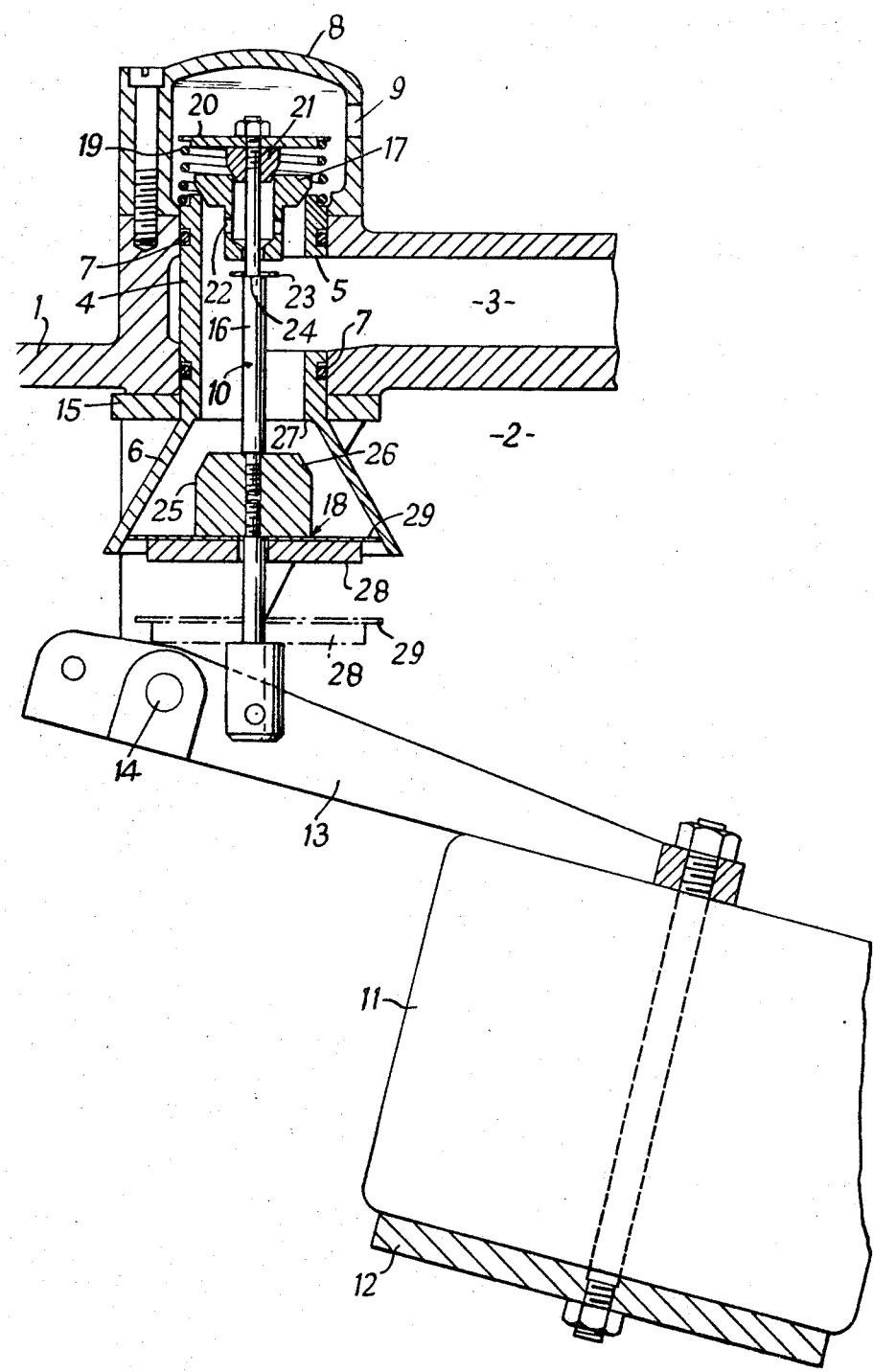

FLUID FLOW CONTROL VALVES

BACKGROUND OF THE INVENTION

This invention relates to automatic fluid flow control valves, and has particular application to centrifugal pumps of the kind provided with auxiliary vacuum pumps which assist in priming the pumps and removing air during subsequent operation. Centrifugal pumps of this kind are marketed under our trademarks VELOVAC and UNIVAC, and are described in the specifications of our British Pat. Nos. 755,249, 1,048,272 and 1,050,893.

With such a centrifugal pump it is important to prevent the water reaching the vacuum pump, and this involves the provision of a cut-off valve usually operated by a float in a chamber. Valve arrangements of this type usually have the disadvantage that in their cut-off position they completely close the suction passageway to the vacuum pump which then runs under heavy load. They also involve complexity and expense and, unless they are of cumbersome dimensions, can constrict the suction passageway to the vacuum pump which may involve the provision of a more powerful vacuum pump than would otherwise be necessary.

SUMMARY OF THE INVENTION

It is an object of the present invention to provide a control valve arrangement in which the above disadvantages are at least reduced.

According to the present invention there is provided a fluid flow control valve comprising a branched passageway communicating on the one hand with atmosphere and on the other hand with a chamber intended to contain liquid and gas, a double headed valve member arranged in said passageway for movement from a first position in which it closes said passageway to atmosphere while opening it to said chamber to a second position in which it closes said passageway to said chamber and opens it to atmosphere, and float means disposed in said chamber and coupled to said valve member, the arrangement being such that when the liquid level in said chamber is below a given level the said valve member is in the first position, whereas upon rise of said liquid level above the given level the float means serves to cause movement of the valve member to said second position.

As a result, when the valve according to the present invention is employed in a VELOVAC, UNIVAC, or like pump, and the water level rises above a predetermined level in the suction chamber, the auxiliary vacuum pump is cut off from the chamber and opened to atmosphere. Thus, not only does the auxiliary vacuum pump run under light load but, also, resetting of the valve to re-open the passageway to the chamber can be effected readily and not against the suction of the auxiliary pump.

Suitably, the said valve member is spring urged into said second position and a float of said float means is weighted in order to move said valve member into the first position under the influence of gravity, when said liquid level is below the given level. With this arrangement the valve will fail safe by moving the valve member to said second position under spring action in the event that the float becomes detached from the valve-operating mechanism.

According to one embodiment of the present invention the said valve member is provided with an auxiliary closure means for closing said passageway to said chamber, said auxiliary closure means being mounted for limited movement relatively to said valve member in the direction of movement of said valve member between the said first and second positions, whereby whilst said valve member remains in the first position the said auxiliary closure means can be moved into a position closing the passageway to said chamber, the said auxiliary closure means being directly connected with a float for moving it into a closing position upon rise of the liquid level within said chamber, being of greater effective area than a part of the valve member for closing said passageway to atmosphere and being so constructed that it can undergo further movement in the closing direction upon initial closure of the passageway to said chamber, whereby upon movement of the auxiliary closure means by said float into an initial closing position, whilst the said passageway is subjected to suction, a reduced pressure is established in said passageway which moves the auxiliary closure means further in the closing direction until, upon completion of the available relative movement between the auxiliary closure means and the valve member, the latter becomes moved to open the passageway to atmosphere. Such an arrangement provides a safeguard against exceptional rise of liquid on failure of the valve member to operate; in such a case the liquid surge would drive the auxiliary closure means into the closing position, whereupon reduced pressure in the said passageway would serve to draw the auxiliary closure means further in its closing direction until the valve member is moved to open the passageway to atmosphere.

BRIEF DESCRIPTION OF THE DRAWING

The accompanying drawing is a detail section view showing a float-operated control valve of a centrifugal water pump, according to the invention.

DETAILED DESCRIPTION OF THE PREFERRED EMBODIMENT

Referring to the drawing, the valve is mounted in top cover 1 of suction chamber 2 of the centrifugal pump to control fluid flow through passage 3 which leads to the auxiliary vacuum pump (not shown).

The valve comprises a tubular body 4 formed with a lateral port 5 which opens into the passage 3, and with a flared lower part 6 which projects into the chamber 2. Sealing rings 7 are sandwiched between the valve body 4 and the recess in the top cover 1 which accommodates the valve body. A cap 8 bolted to the top cover 1 shields the upper end of the valve, the cap being formed with at least one lateral port 9 which opens to atmosphere.

A double headed valve member 10 is vertically movable within the body 4, under the action of a float 11. The float, which includes a ballast plate 12, is carried at the end of a pivotal arm 13 mounted on a fulcrum pin 14 which is carried by fixed bracket 15. The valve member 10 comprises a vertical connecting rod 16 on which are mounted a tubular upper closure member 17 and a composite lower closure member 18. The valve member 10 is urged upwardly by a compression spring 19 which reacts against the valve body 4 and engages a retaining plate 20 secured to the top end of the rod 16.

The tubular closure member 17 is slidable along the rod 16 and is arranged to seat, on the one hand, on the top rim of the body 4 and, on the other hand, on a pilot valve member 21 which is secured, with plate 20, to the top end of the rod 16. The tubular body of member 17 is formed with lateral ports 22, and a washer 23 is carried by a shoulder 24 on the rod 16 to lift the member 17.

The lower closure member 18 comprises a boss 25 which is sandwiched between fixed shoulders on the rod 16 and is formed with an angled upper face 26 which is arranged to seat on seating 27 at the top of the flared part 6 of body 4. The member 18 also includes a fail-safe auxiliary closure means comprising a float 28 and a rubber disc 29 carried by this float and arranged to seat (as shown) on the flared part 6. The disc 29 and its supporting float 28 are slidable along rod 16 between the positions shown in full and broken lines, respectively.

During normal operation of the centrifugal pump, the water level in the suction chamber is low and the float 11 is in its "down" position as shown in the drawing. The valve rod 16 is likewise in the position shown, but the float 28 and disc 29 are as shown in broken lines. In this position of the valve, the auxiliary vacuum pump extracts air from chamber 2 through passage 3, the upper valve members 17 and 21 closing the system to atmosphere, and the dimensions of the lower part of the valve avoid constriction of the suction passageway from the chamber to the vacuum pump.

If, during running of the centrifugal pump, the water level in chamber 2 rises substantially, the float 11 is also raised and this lifts the valve rod 16 to open the upper part of the valve and close the lower part of the valve. When the rod 16 starts to rise, the pilot valve member 21 first opens the passage 3 to atmosphere, through ports 22 and 9, this movement being assisted by the compression spring 19, and the opening of the pilot valve facilitates the subsequent lifting of the tubular valve member 17 to open the passage 3 fully to atmosphere. Further raising of the valve rod 16 also lifts the boss 25 to close the lower end of the body 4 and so cut off the chamber 2 from the passage 3 and the auxiliary vacuum pump. The auxiliary vacuum pump is, however, still open to atmosphere and thus is not heavily loaded.

On return of the water level to its normal low level, the float will fall and re-open the chamber 2 to the passage 3, and this reopening is effected without the difficulty of overcoming suction (on the disc 29) of the auxiliary vacuum pump as the passage 3 is still open to atmosphere.

Two possible circumstances of failure of the float 11 will now be considered.

Firstly, if float failure occurs due to breakage of the arm 13 or detachment of the bolted float 11, the consequent absence of the ballast plate 12 will result in the spring 19 raising the valve member 10.

Secondly, if float failure occurs due to jamming of the arm 13 or the rod 16 or to rupture of a hollow float 11, water would continue to rise inside the chamber 2 and tend to enter the passage 3. However, in this case, the float 28 would be raised to close the flared opening in the valve body 4 and, due to the flexibility of the rubber disc 29, the suction of the vacuum pump would tend to draw the auxiliary closure means further into intimate contact with the flared part 6 and the base of the boss 25. Owing to the different effective areas of the disc 29 and pilot valve 21 the suction of the vacuum pump would also tend to raise the valve member 10 until the passage 3 is opened to atmosphere.

Modifications may be made without departing from the scope of the invention. For example, it might be possible to dispense with the main float 11 and rely simply on the operation of the fail-safe seal, in which case it might be desirable to provide a larger float 28. In a simplified version, the pilot valve (21) may be omitted and the valve member 17 fixedly secured to the top end of rod 16.

What is claimed is:

1. A priming device for a centrifugal liquid pump including:

a chamber communicating with the suction side of the pump;

a passageway communicating with a vacuum source;

a first opening from said passageway to said chamber;

a second opening from said passageway to atmosphere;

a double headed valve member of which the valve heads are arranged to close said first and second openings respectively;

and a float member arranged in said chamber and connected to said valve member to transmit movement thereto, said float member controlling said valve in response to a low liquid level in said chamber to cause said one valve head of said float member to close said second opening while maintaining the first opening open, said float member controlling said valve in response to a higher liquid level in said chamber to cause said other valve head to close the first opening while maintaining the second opening open;

said valve head for closing the second opening comprising a generally annular valve head mounted for limited axial sliding movement upon the valve member, a valve seat in said second opening at times mating with said annular valve head, a conduit extending through said annular valve head and terminating in a valve seating coaxial with the valve head, a smaller valve head fixed to said valve member and arranged to cooperate with the valve seating in said annular valve head, and a helical compression spring located coaxially around said valve member and said annular valve head externally of said second opening, said spring being stressed between a radially extending abutment of said smaller valve head and the body of the device defining said second opening so as to bias said valve toward a position opening said second opening;

the weight of the float member being sufficient to overcome the force of said spring and hold the valve in the position closing said second opening when unsupported by liquid present in said chamber.

2. A fluid flow control valve comprising a branched passageway communicating on the one hand with atmosphere and on the other hand with a chamber intended to contain liquid and gas, a double headed valve member arranged in said passageway for movement from a first position in which it closes said passageway to atmosphere while opening it to said chamber to a second position in which it closes said passageway to said chamber and opens it to atmosphere, and float means disposed in said chamber and coupled to said valve member, the arrangement being such that when the liquid level in said chamber is below a given level the said valve member is in the first position whereas upon rise of said liquid level above the given level the float means serves to cause movement of the valve member to said second position, said valve member being provided with an auxiliary closure means for closing said passageway to said chamber, said auxiliary closure means being mounted for limited movement relatively to said valve member in the direction of movement of said valve member between the said first and second positions, whereby while said valve member remains in the first position said auxiliary closure means can be moved into a position closing the passageway to said chamber, said auxiliary closure means being directly connected with a second float means for moving it into a closing position upon rise of the liquid level within said chamber, said auxiliary closure means being of greater effective area than a part of the valve member for closing said passageway to atmosphere and being so constructed that it can undergo further movement in the closing direction upon initial closure of the passageway to said chamber, whereby upon movement of the auxiliary closure means by said second float means into an initial closing position whilst the said passageway is subjected to suction a reduced pressure is established in said passageway which moves the auxiliary closure means further in the closing direction until, upon completion of the available relative movement between the auxiliary closure means and the valve member, the latter becomes moved to open the passageway to atmosphere.

3. A valve according to claim 2, wherein the said auxiliary closure means comprises a radial plate which is at least partially flexible and resilient, is arranged for limited axial movement upon said valve member for cooperation with a flared throat of said passageway, and is directly mounted upon an annular float coaxial with said valve member and arranged in said chamber.

* * * * *